US008121789B2

(12) United States Patent
Dickens et al.

(10) Patent No.: US 8,121,789 B2
(45) Date of Patent: Feb. 21, 2012

(54) METHOD FOR CORRECTING THE PHASE OF ELECTROMAGNETIC DATA

(75) Inventors: Thomas A. Dickens, Houston, TX (US); Charlie Jing, Houston, TX (US); Dennis E. Willen, Houston, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 621 days.

(21) Appl. No.: 12/303,673

(22) PCT Filed: Jun. 12, 2007

(86) PCT No.: PCT/US2007/013737
§ 371 (c)(1),
(2), (4) Date: Dec. 5, 2008

(87) PCT Pub. No.: WO2008/013609
PCT Pub. Date: Jan. 31, 2008

(65) Prior Publication Data
US 2010/0176791 A1    Jul. 15, 2010

Related U.S. Application Data

(60) Provisional application No. 60/833,088, filed on Jul. 25, 2006.

(51) Int. Cl.
*G01V 1/40* (2006.01)
(52) U.S. Cl. ........................................................ 702/11
(58) Field of Classification Search .................. 702/6–13
See application file for complete search history.

(56) References Cited

U.S. PATENT DOCUMENTS

| 5,811,972 A | * | 9/1998 | Thompson et al. | ............ 324/338 |
| 5,933,789 A | * | 8/1999 | Byun et al. | ........................ 702/17 |
| 6,108,605 A |   | 8/2000 | Doyle et al. | ....................... 702/7 |

(Continued)

FOREIGN PATENT DOCUMENTS

GB        2 395 563 A    5/2004
(Continued)

OTHER PUBLICATIONS

Allen, J. et al. (1977) "A Unified Approach to Short-Time Fourier Analysis and Synthesis," *Proc. of the IEEE*, v.65, No. 11, pp. 1558-1564.

(Continued)

*Primary Examiner* — Drew A Dunn
*Assistant Examiner* — Stephen Cherry
(74) *Attorney, Agent, or Firm* — ExxonMobil Upstream Reasearch Co. Law Dept.

(57) ABSTRACT

Method for identifying, determining and correcting source-related phase errors in data from a controlled source electromagnetic survey by using data from ordinary survey receivers, i.e. without benefit of source monitoring data. Abrupt anomalies indicating source malfunctions are identified (71) in the time domain by plotting time intervals between neighboring zero crossings or by zero-lag cross correlation between consecutive bins of receiver data, and the amount of the time error (73) can be determined by performing cross correlation between two bins on either side of an anomaly. In the frequency domain, transmitter anomalies can be identified by looking for discontinuities in plots of phase vs. offset, and the corrective phase shift can be determined by matching the phase on one side of the anomaly to that on the other side. A global time/phase shift (76) can be determined by using phase frequency-scaling behavior at near offsets.

16 Claims, 5 Drawing Sheets

U.S. PATENT DOCUMENTS

2004/0124842 A1  7/2004  Eidesmo et al. ............... 324/337

FOREIGN PATENT DOCUMENTS

| WO | WO 03/048812 | 6/2003 |
| WO | WO 2007/092070 | 8/2007 |
| WO | WO 2008/033184 | 3/2008 |

OTHER PUBLICATIONS

Chave, A.D. et al. (1991) "Electrical Exploration Methods for the Seafloor," *Investigations in Geophysics* No. 3, *Electromagnetic Methods in Applied Geophysics*, vol. 2, edited by Misac N. Nabighian, Society of Exploration Geophysicists.

Choi, H.I. et al (1989) "Improved Time-Frequency Representation of Multicomponent Signals Using Exponential Kernals," *IEEE Trans. on Acous. Speech. and Signal Processing*, v. 37, No. 6, pp. 862-871.

Constable, S.C. (1998) "Marine Magnetotellurics for Petroleum Exploration Part I: A Sea-Floor Equipment System," *Geophysics*, v. 63, No. 3, pp. 816-825.

Ellingsrud, S. et al. (2002) "Remote sensing of hydrocarbon layers by seabed logging (SBL): Results from a cruise offshore Angola," *The Leading Edge*, v. 21, pp. 972-982.

Ghou, Z. et al. (1994) "The Time-Frequency Distributions of Nonstationary Signals Based on a Bessel Kernel," *IEEE Trans. on Signal Proc.*, v. 42, No. 7, pp. 1700-1707.

Lang, W.C. et al. (1998), "Time-Frequency Analysis With the Continuous Wavelet Transform," *Am. J. Phys.*, v. 66, No. 9, pp. 794-797.

MacGregor, L. et al. (2001), "Electrical Resistivity Structure of the Valu Fa Ridge, Lau Basin From Marine Controlled-Source Electromagnetic Sounding," *Geophysics J. Int.*, v. 146, pp. 217-236.

MacGregor, L. et al. (1998), "The RAMESSES Experiment—III. Controlled-Source Electromagnetic Sounding of the Reykjanes Ridge at 57°45'N," *Geophysics J. Int.*, v. 135, pp. 773-789.

Wigner, E. (1932), "On the Quantum Correction of Thermodynamic Equilibrium," *Phys. Rev.*, v. 40, pp. 749-759.

Yilmaz, Ö. (1987), "Sesimic Data Analysis," v. 1 in *Investigations in Geophysics*, E.B. Neitzel, ed., Society of Geophysics, pp. 498-506.

*European Search Report*, dated Nov. 22, 2006 (RS 114229).

*International Search Report & Written Opinion*, dated Jan. 29, 2008 for PCT/US2007/013737.

* cited by examiner

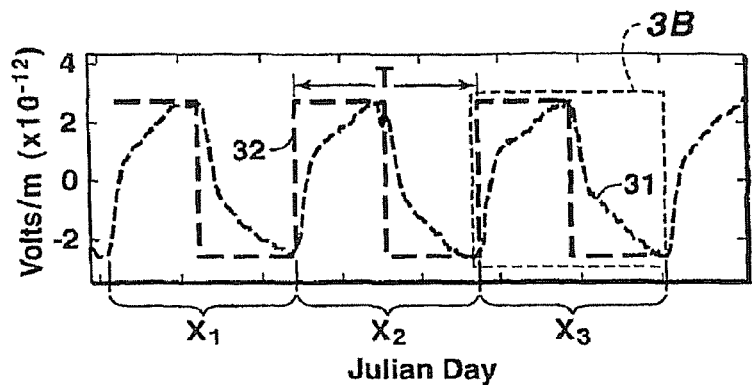
FIG. 3A
*(Prior Art)*
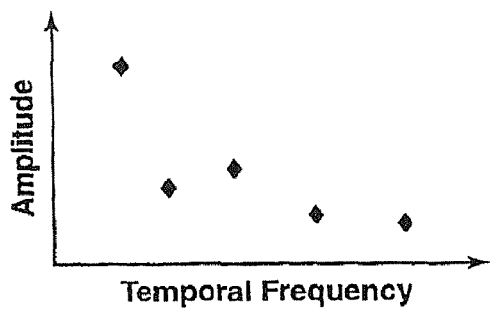
FIG. 3B
*(Prior Art)*
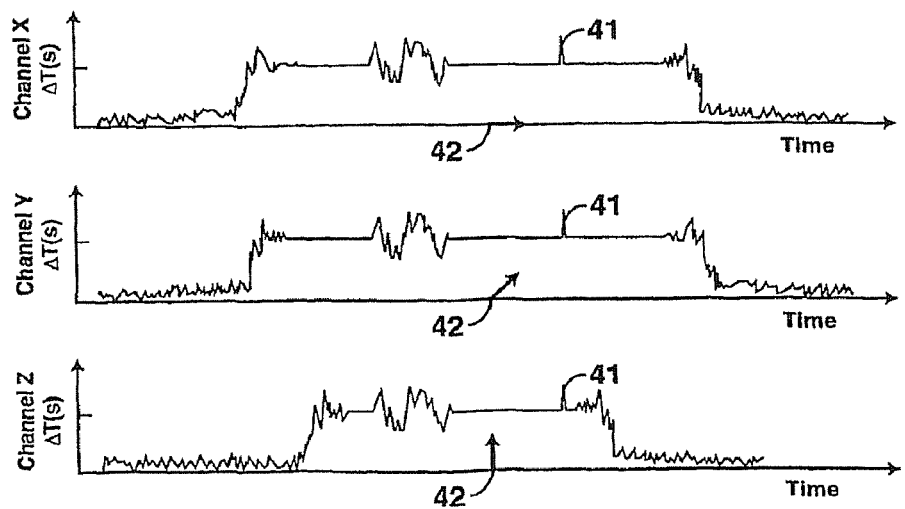
FIG. 4A
FIG. 4B
FIG. 4C

METHOD FOR CORRECTING THE PHASE OF ELECTROMAGNETIC DATA

This application is a National Stage entry under 35 U.S.C. 371 of PCT/US2007/013737 that published as WO 2008/013609 and was filed on Jun. 12, 2007 and claims the benefit of U.S. Provisional application 60/833,088 which was filed on Jul. 25, 2006.

FIELD OF THE INVENTION

This invention relates generally to the field of geophysical prospecting, and more particularly to electromagnetic prospecting for hydrocarbons. Specifically, the invention is a method for detecting, determining, and correcting phase errors in controlled source electromagnetic ("CSEM") data by using normal-receiver data alone.

BACKGROUND OF THE INVENTION

The CSEM survey technique is an important geophysical tool for prospecting for hydrocarbons in the earth's subsurface. In a CSEM survey, an electromagnetic-wave source (transmitter) generates an electromagnetic wave. The electromagnetic signal induced in the earth by the transmitter is recorded continuously in time by one or more receivers. The electromagnetic signal at a receiver location depends on physical properties, especially the electrical properties, of the medium through which the electromagnetic wave has passed from the source to the receiver. The behavior of this signal as a function of frequency and transmitter location or separation (offset) between transmitter and receiver can be used to estimate the spatially varying resistivity model of the subsurface. This estimated resistivity model is used for identifying hydrocarbons in the earth's subsurface.

In a typical marine CSEM survey, a constantly active electromagnetic-wave transmitter is towed along a line 11 above electromagnetic receivers 12 deployed on the seafloor 13, as illustrated in FIG. 1. For more details see for example Chapter 12, page 931 in *Investigations In Geophysics No. 3, Electromagnetic Methods In Applied Geophysics*, volume 2, edited by Misac N. Nabighian, Society of Exploration Geophysicists (1991). The receivers typically have multiple sensors designed to record different vector components of the electric and/or magnetic fields. The directions of the received data components by the receivers are indicated in FIG. 1 by arrows. Transmitter locations are illustrated by arrows along line 11 above the receivers. Normally, the separation between neighboring transmitter locations is much smaller than that between neighboring receivers. Transmitter-receiver offset is defined as the distance 14 between a transmitter location and a receiver location. The transmitting and receiving systems typically operate independently (without any connection between them), so that receiver data must be synchronized with shipboard measurements of the instantaneous transmitter position and electric current in the transmitter antenna by comparing clock times on the receivers to time from a shipboard or GPS (Global Positioning System) standard.

Every receiver records the electromagnetic signal continuously in time during a survey. The data recorded by one sensor (channel) on a receiver are called a common-receiver gather. This gather represents the electromagnetic signal at the receiver location induced by the source at all different source locations, or at different times during the survey. FIGS. 2A-C depict the measured electrical signals recorded by the three sensors of a receiver within a short time window (only a few transmitter waveforms) taken out of a common-receiver gather together with (FIG. 2D) the transmitter waveform that gave rise to it. FIG. 2A shows the measured x-component of the electric field, FIG. 2B the measured y-component and FIG. 2C the measured z-component. FIG. 2D shows the transmitter current signal of a square waveform with designed half period 4 s. An anomalous transmitter pulse 21 of 6 s width shows up on all three channels of the receiver. In practice, the transmitter signal may be a more complex waveform than the square wave depicted in FIG. 2D.

Marine CSEM data are typically interpreted in the temporal frequency domain. The resulting transformed data will have components at certain frequencies, determined by the frequency spectrum of the particular source waveform. After taking out the frequency-dependent effects of the source and the receiver itself, the signal at a frequency represents the response of the earth to an electromagnetic signal at that temporal frequency. Like any other type of wave, the electromagnetic signal in a CSEM survey has two attributes, amplitude and phase. The signals are therefore conveniently represented as complex numbers in either rectangular (real-imaginary) or polar (amplitude-phase) form.

In practice, the receiver data are usually converted to temporal frequency by dividing (or "binning") the recorded time-domain data 31 into time intervals, e.g., bins $x_1$, $x_2$, and $x_3$ in FIG. 3A, and determining the spectrum within each bin by standard methods based on the Fourier Transform. FIG. 3B shows the amplitudes of the spectral components from the bin $x_3$. A typical bin length can be one or several periods of the transmitter waveform 32. Some methods of transforming data to the time-frequency domain include the Short-Time Fourier Transform (J. Allen, L. Rabiner, "A Unified Approach to Short-Time Fourier Analysis and Synthesis," *Proc. of the IEEE* 65, 1558-64, (1977)); the Wavelet Transform (W. C. Lang and K. Forinash, "Time-frequency analysis with the continous wavelet transform," *Am. J. Phys.* 66, 794-797, (1998)); the Wigner-Ville transform (E. Wigner, "On the quantum correction for thermodynamic equilibrium," *Phys. Rev.* 40, 749-759, (1932)); the Choi-Williams transform (H. Choi and W. Williams, "Improved time-frequency representation of multicomponent signals using exponential kernels," *IEEE Trans. on Acoust., Speech, and Signal Processing* 37, 862-871, (1989)); and the Bessel method (Z. Guo, L. G. Durand, and H. C. Lee, "The time-frequency distributions of nonstationary signals based on a Bessel kernel," *IEEE Trans. on Signal Proc.* 42, 1700-1707, (1994)). The present invention is not limited to any particular method or methods for spectral decomposition of CSEM data to the temporal-frequency domain. In the temporal-frequency domain, signals, including both amplitude and phase, of each of the temporal-frequency components are functions of a bin designation variable (label).

With each temporal bin is associated a time, typically the Julian date at the center of the bin. Since the transmitter location is known as a function of time, these bins may be interchangeably labeled in several different ways: by Julian date of the bin center; by transmitter position; by the signed offset distance between source and receiver; by the cumulative distance traveled by the transmitter relative to some arbitrarily chosen starting point; or sometimes simply by a sequential bin number.

In many examples of CSEM hardware, data cannot be effectively recorded at the nearest offsets because the dynamic range of the receiver's digitizers is too small to accommodate the large dynamic range of the data. This region is sometimes known as the "saturation zone" and typically encompasses source-receiver offsets of less than about 500 meters. At far offsets, the controlled-source signal is too weak to be observed above the earth's magnetotellurics energy and other noises such as those induced by oceanic currents. This signal level may be called the "noise floor".

Both amplitudes and phased of the CSEM data depend on the subsurface conductivities. Both of them need to be determined accurately in order to distinguish characteristics that signal the presence or absence of conductivity anomalies in the subsurface. Reliable phases of CSEM data are essential in applying inversion techniques for conductivity-anomaly detections. However, in a CSEM survey, the phase variations of CSEM data can be caused by many factors that are not related to the variations of the subsurface conductivity in the target zones. Some of these factors are identified in the following list:

(a) the transmitter current waveform deviates from the desired waveform, i.e., transmitter instability;

(b) the transmitter monitoring system fails to measure and/or report the actual transmitter current waveform accurately;

(c) transmitter and receiver signals are recorded separately using different time bases (clocks) that are not synchronized against a common GPS time base;

(d) the frequency-dependent responses of a receiver, such as receiver amplifiers, receiver antennae, and their combination, are not calibrated accurately;

(e) localized changes in the earth's resistivity close to a receiver mask the electromagnetic signals from the desired target zones.

Phase errors of the types of categories (a) and (b) above are common, and can occur in both land and marine CSEM surveys. As an example of the type of problem of category (c) above, if the time origin of the transmitter waveform (sometimes known as the "initial transmitter phase") is in error by $\Delta t$, the phase of the receiver data in frequency domain at angular frequency $\omega$ will be incremented by an amount $\omega \Delta t$. Similar factors arise on land, although it is easier to connect both the source and receivers to a common time reference, thus reducing the phase error associated with the clock synchronization.

Some techniques have been disclosed in the published literature for reducing the phase errors caused by some of the factors listed above. Direct measurement of the receiver-clock drift (time error) relative to a time reference (such as GPS) at the start and end of the survey allows users to stretch or compress measured data to an estimate of the reference time (Constable et al., "Marine magnetotellurics for petroleum exploration Part 1: A sea-floor equipment system," *Geophysics* 63, 816-825 (1998)). This correction can reduce the error caused by the receiver clock drifts. Laboratory measurements of the response of the receiver's amplifier-antenna system have been used to compensate field CSEM data (Ellingsrud, et al., "Remote sensing of hydrocarbon layers by seabed logging (SBL): Results from a cruise offshore Angola," *The Leading Edge* 21, 972-982 (2002)).

As pointed out above, if the time origin of the transmitter waveform is in error by $\Delta t$, the phase of the receiver data in frequency domain at angular frequency $\omega$ will be incremented by an amount $\omega \Delta t$. This type of error can also be caused by undesired variation of the transmitter waveform. To resolve the problems of transmitter instability and timing error associated with the transmitter (initial phase error), the transmitter current is usually recorded continuously during the survey by the source monitoring system. An independent monitoring receiver has also been mounted to the towed underwater transmitter previously to monitor the transmitter current that is actually injected into the water (MacGregor et al., "The RAMESSES experiment-III. Controlled-source electromagnetic sounding of the Reykjanes Ridge at 57° 45′ N," *Geophys. J. Int.* 135, 773-789 (1998)). In all cases, the transmitter signals recorded by the monitoring system in the time domain are used to identify and compensate the phase shifts caused by anomalous transmitter signal variations during the survey.

In principle, a source deconvolution technique can be used to obtain the response of the subsurface at each frequency once the source signal is known reliably even though the source may exhibit undesired variations (Ö. Yilmaz, *Seismic Data Processing*, Vol. 2 in *Investigations in Geophysics*, E. B. Neitzel, ed., Society of Geophysics, 498-506 (1987)). However, the deconvolution technique strongly depends on the fidelity of the recorded source signals during the survey. This dependence combined with the shortcomings of the deconvolution technique itself makes the application of this technique to CSEM data difficult. Instead, in CSEM data processing, one continuous transmitter towline is normally split into multiple sublines. Time windows of erratic variation in transmitter signal are skipped. Each subline uses a different transmitter initial time (or initial phase), determined from the transmitter current signals, for processing. The major shortcoming of this method and the deconvolution technique is the dependence on the measured transmitter signals. The measured transmitter signals may not be reliable and/or available due to malfunctions or failures of the source monitoring system. Also, splitting one towline into multiple sublines renders CSEM data processing tedious and error-prone. After data processing with the transmitter initial times (or phases), normally the data still have residual phase errors that need to be corrected by other methods.

Another method to detect and correct phase errors is to determine any timing error for one common-receiver gather by utilizing the frequency scaling behavior of the electromagnetic field in a uniform medium (PCT International Patent Application No. PCT/US06/46329). The phase of the electromagnetic field from a dipole in a uniform medium is a function of $(R\sqrt{\omega})$, where R is the distance between the transmitter and the receiver (called offset), and $\omega$ is the angular frequency. In a homogeneous-earth model, the phase variations with the frequency-scaled transmitter-receiver offset, ($R\sqrt{\omega}$), are the same for different frequencies. In a one-dimensional layered-earth model, data at small transmitter-receiver offsets shows a similar scaling behavior. Separation of the phase versus scaled-offset curves at different frequencies within a small offset range (e.g. within 2 km but outside the saturation zone) indicates a time error assuming the conductivity variation within the small offset range is small. A timing error can be determined by maximizing the overlap of the phase versus scaled-offset curves of different frequencies at near offset. The timing error determined from this method includes components from both transmitter and receiver clocks. This method is effective in determining the global phase shift for a common-receiver gather, ensuring that the phase goes to zero as the source and receiver offset goes to zero, as required by the laws of physics. However, this method is not valid when near-offset data (such as those with offset less than 1 km) do not exist or the undesired transmitter variations happen at locations too far from the receiver location for the frequency-scaling behavior of the phase to be valid.

What is needed is a method, applicable to both onshore and offshore CSEM surveys, that can detect, determine, and correct phase errors related to the source (i.e., categories (a) and (b) in the list above) based on data from normal, ordinary survey receivers, i.e. without using a source signal measured by a source monitoring system, so that data phase errors can be corrected when the source monitoring data are either not reliable or not available. The present invention satisfies this need.

SUMMARY OF THE INVENTION

In one of its embodiments, the present invention is a method for correcting source-related phase errors in electromagnetic data signals recorded by receivers in a controlled-source electromagnetic survey of a subsurface region, comprising:

(a) selecting a source line from the survey and an ordinary survey receiver associated with the selected source line, and obtaining the electromagnetic data measured by the selected receiver for source positions along the selected source line, said obtained data being referred to as a "receiver gather";

(b) finding a source-related anomaly in the receiver gather by examination of said data;

(c) determining from the receiver gather a time shift or corresponding phase shift due to the anomaly; and (d) using the time/phase shift to adjust the phase of the data in the receiver gather.

In typical applications, the above-described process is repeated for other source-related anomalies in the data record for the selected receiver and source line, then repeated for other receivers on the source line and finally all the preceding is repeated for other source lines in the survey. Moreover, some embodiments of the invention include determining whether the receiver gather has a global time/phase error, and if so, determining the error and correcting the gather by applying a time/phase shift.

BRIEF DESCRIPTION OF THE DRAWINGS

The present invention and its advantages will be better understood by referring to the following detailed description and the attached drawings in which:

FIGS. 3A-B illustrate the process of binning a receiver signal in time and determining the frequency spectrum within each bin by Fourier analysis;

FIGS. 4A-C show plots of time intervals between neighboring zero-crossings determined from receiver data for a transmitter of square-wave waveform of half period 4 s as shown in FIG. 2D;

Figure 1:
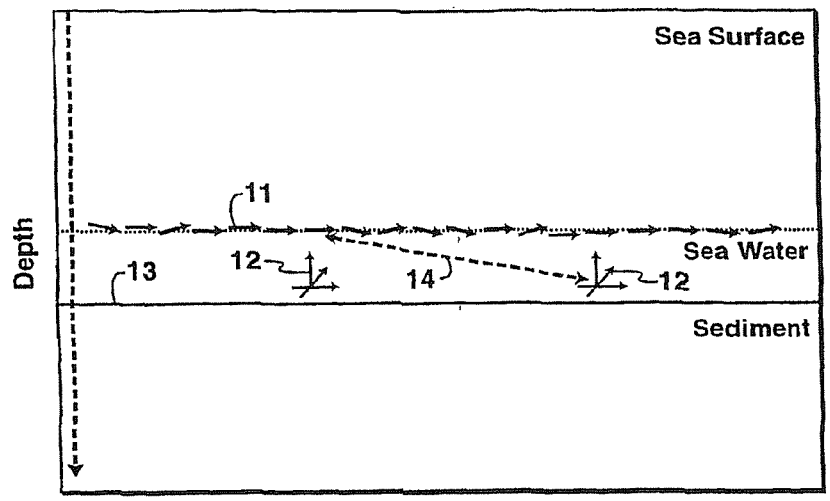
FIG. 1 is a schematic diagram of a marine CSEM purvey with multi-component receivers located at the sea floor.
Figure 2A:
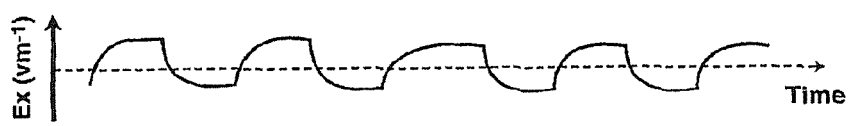
FIGS. 2A-D are plots showing the signals recorded by the three electric field channels ($E_X$, $E_Y$, and $E_Z$) and the square wave transmitter signal that produced the receiver responses.
Figure 2B:
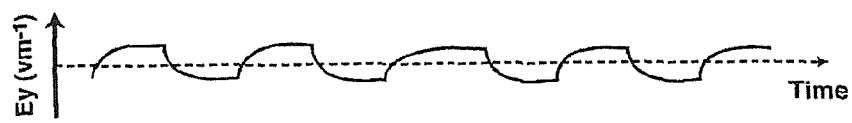
Figure 2C:
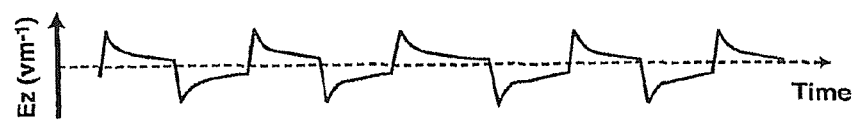
Figure 2D:
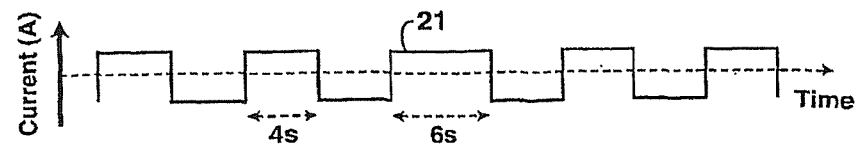

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for identifying, determining, and correcting phase errors of CSEM data resulting from transmitter anomalies by using ordinary-receiver data alone. The ordinary receivers in this invention are those receivers deployed for recording the induced electromagnetic field by the active source in a CSEM survey (generally referred to as the survey receivers, or simply receivers), in contrast to a receiver associated with the source-signal monitoring system measuring the electric current of the source or the direct electromagnetic field from the source. The receiver in the source-monitoring system is usually connected to the source so that the offset does not vary during the survey. One significant aspect of this invention is its capability to identify, determine, and correct CSEM data phase errors by using data recorded by the ordinary receivers deployed on the sea floor alone for marine surveys or on land for land surveys. The transmitter data may in some cases not be reliable, or may not even be available due to failures of the monitoring system.

In one embodiment of the invention, the current inventive method includes the following two basic steps:

(a) detecting anomalous transmitter-pulse location(s) or windows directly from the raw ordinary-receiver data in the time domain; and (b) determining and correcting phase errors caused by anomalous transmitter pulses using the continuity of phase and its derivative (with respect to source-receiver offset) with source-receiver offset and/or time-domain correlations of the receiver waveforms, frequency scaling behavior at near offset.

One embodiment of the present inventive method can be more fully summarized in the following description, which refers to the flow chart of FIG. 7

At step 71, data from an ordinary survey receiver is examined for anomalies that could affect the phase of later data. This may be accomplished by scanning receiver-gather data in the time domain using zero-crossing-interval detection and/or cross-correlation techniques (both explained below) to locate locations and/or time (or offset) windows exhibiting transmitter anomalies. Alternatively, this may be accomplished by identifying anomalous phase variations (versus offset) of the data in the frequency domain. At step 72, one such anomaly is selected for phase correcting. At step 73, the relative time shift across the selected anomaly window is determined, possibly by using the cross-correlation technique to applied to the data in the time domain. Alternatively, a phase shift can be determined by phase matching the data in the frequency domain. In the latter case, the receiver data are transformed from time domain to frequency domain by using a common initial time or phase (may be arbitrary) for all receivers in one towline. In the frequency domain, the phase shift across an anomaly window can be determined by matching the phase of the receiver data at a frequency ω at the bin just after the anomaly to the phase at the bin just before the anomaly. (Decomposition into the frequency domain divides the data into components, each component associated with a particular frequency in the source's frequency spectrum.) It may be noted that this phase error, $\Delta\phi$, may be equated to a corresponding timing error (the same timing error that could be determined directly in the time domain) by the relationship $\Delta\phi=\omega\Delta t$. In practice, this phase shift may be observable on data from some receivers but not on data from receivers whose signals have fallen below the noise floor. At step 74, the anomaly is fixed (i.e., a correction is made) by applying a phase shift correction $\exp(-i\omega\Delta t)$ to all data (including data below the noise floor) just after the anomaly window by using the time shift (or phase shift) determined at step 73.

At step 75, it may be decided to fix another anomaly discovered at step 71. Steps 72-74 are typically repeated until all transmitter anomalies detected in step 71 for the chosen receiver gather in the chosen towline are corrected. When the time duration of a transmitter anomalous variation is too long for the phase match technique to work in step 73, the cross-correlation technique can be used to determine the time shift in the time domain. Typically, but not necessarily, when a time shift is determined in the time domain in step 73, the correction in step 74 is applied also in the time domain. Similarly, when a phase shift is determined in the frequency domain in step 73, the correction in step 74 is conveniently applied also in the frequency domain, one frequency component at a time.

At this point in the present inventive method, the phase along a towline, or phase plotted against offset, has been made continuous for the selected receiver gather and towline. But there still may be a global phase or time error (for example, an error in the choice of the time origin, t=0), or there may be a global phase shift of the whole phase curve (for an individual frequency) along the tow line (phase vs. offset curve). A preferred way to check for whether a global correction is needed, and to determine the appropriate correction (step 76), is to use the phase-scaling behavior at near offset, a technique disclosed by Willen (PCT International Patent Application No. PCT/US06/46329). This technique is performed on the data components in the frequency domain.

In typical applications, steps 71-76 are repeated for all (or selected) receiver gathers on the chosen tow line, and for all (or selected) tow lines in the survey (step 77).

The time-domain pulse measured by an ordinary receiver is a filtered version of the transmitter pulse. The filtering effect comes from the electromagnetic wave propagation in the earth's subsurface. The variation in pulse shape from one period to the next should be very small due to the small distance traveled by the transmitter in one transmitter-pulse period, normally less than a few meters. Any abrupt changes of pulse shape, including the pulse period, are indications of transmitter-signal anomalies. Those anomalies can be detected from the raw ordinary-receiver data as long as the signal is above the noise floor.

Transmitter anomalies can be detected by zero-lag cross correlation between two consecutive bins of the receiver data in time domain. By performing cross correlation between two bins on both sides of a transmitter anomaly, the relative time shift across the anomaly can be determined. Once the time shift across an anomaly is determined in time domain by the cross-correlation technique, the anomaly can be corrected by using a different initial transmitter phase corresponding to the time shift to the data after the anomaly in the transformation from time domain to frequency domain. This is equivalent to applying a frequency-dependent phase shift of $\exp(-i\omega\Delta t)$ across an anomaly in frequency domain. The time shift can also be corrected in time domain by directly shifting the time axis to the data after the anomaly.

The phase error caused by a transmitter anomaly can also be corrected in frequency domain by phase matching. Matching the data phase at one side of a transmitter anomaly to that at another side is based on the fact that the phase of the CSEM data from a transmitter should be continuous versus the transmitter-receiver offset. In most practical applications, the first-order derivative of the phase with respect to offset can also be treated to be continuous versus offset. This can be used to extrapolate the phase across a time (or offset) window of anonymous transmitter signals to correct the phase error introduced by the transmitter anomalies.

The application of the phase correction to transmitter anomalies within a towline makes the phase consistent along the whole towline. The phase frequency-scaling technique can fix the global time shift error of the towline and any time shifts caused by un-detected and un-corrected transmitter anomalies that occurred in time windows where the signals fall below the noise floor by using near-offset data of the towline. When the time or phase errors are caused by transmitter anomalies, the detected time shift across an anomaly from one receiver gather can be used to correct all receiver gathers sharing the same towline across the same transmitter anomaly. The combination and repeat application of those techniques can correct most of the phase errors caused by transmitter anomalies in a CSEM survey without using the source-monitoring data.

Some receiver gathers may still have undetermined global time errors after the process when there are no near-offset data to correct the global time error of the corresponding towline. The global time errors cannot be determined accurately from the ordinary receiver data alone under this situation without further assumption on subsurface geology. But, these situations are rare. A more detailed description of the invention follows.

Detecting Anomalous Variations of Transmitter Signal

As shown in FIG. 2, the pulses recorded by a channel at a receiver location have the same period and similar shape if the transmitter signal behaves normally as designed. An anomalous transmitter-signal variation at a particular transmitter location, such as that at 21 in FIG. 2D, will cause an anomalous pulse on the receiver data, as shown in FIGS. 2A-C. Thus, one can scan the data recorded by ordinary receivers to determine locations (or times) of any anomalous pulses. This can be done, for simple transmitter waveforms such as a square wave, by simply determining and plotting the time intervals between neighboring zero-crossings. For more complicated transmitter waveforms, this technique may fail due to the presence of too many zero crossings within a period or the absence of clear zero crossings. In this case, zero-lag cross correlation of two successive time bins (each having a width of one or more periods of the received waveform), will show the presence of anomalies at locations where the zero-lag cross-correlation coefficients are reduced compared to locations of normal transmitter signals. If an anomalous zero-crossing time interval (or zero-lag cross-correlation coefficient) appears on all of the three channels at the same time (which corresponds to the same transmitter location), this anomaly is most likely caused by an anomalous transmitter pulse.

As stated, FIGS. 2A-D show a single-pulse anomaly, with a half period longer than the designed value of 4 s, recorded by each of the three channels. This anomaly is detected directly from receiver data on the zero-crossing time-interval plots shown in FIGS. 4A-C by the single spike 41 on the right side of the receiver location 42 in each of the three channels. In this instance, the anomaly can be confirmed from the transmitter monitoring data displayed in FIG. 2D. The transmitter can sometimes be unstable for a period of time much longer than one period of the pulse, as detected and shown in FIGS. 4A-C by the multiple spikes at the left side of the receiver location 42. Each spike indicates a time interval between zero crossings different from 4 s, i.e., an anomalous pulse. The tails at both ends of each channel indicate the area where the signal falls below the noise floor.

Figure 5A:
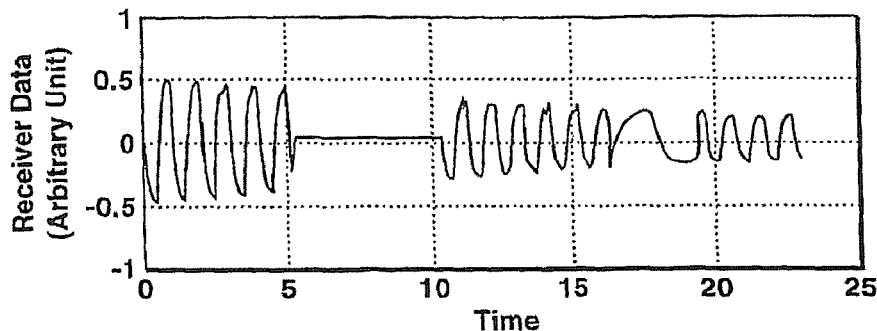
FIGS. 5A-D illustrate the detection of transmitter anomalies and determination of time shifts across anomalies using cross correlation.
Figure 5B:
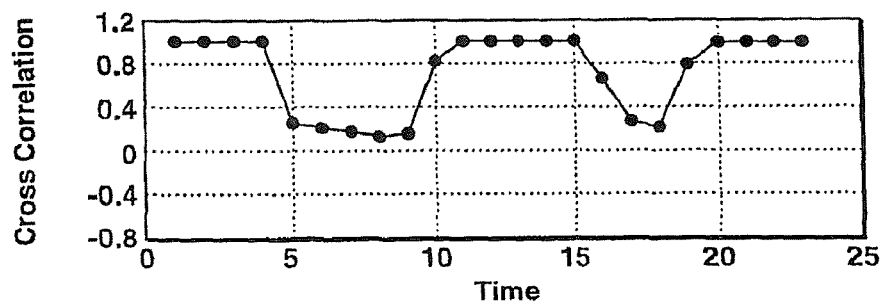

FIGS. 5A-D show the detection of anomalous transmitter waveforms by a different technique: the cross-correlation technique. FIG. 5B shows a plot of the zero-lag cross-correlation coefficient of two successive bins versus time (or bin)

corresponding to the receiver data shown in FIG. 5A. The locations showing cross-correlation coefficients less than a critical value (the critical value being less than but close to 1.0) indicate the presence of abnormal transmitter pulses. The same scheme can also be applied to the recorded transmitter data, if available, for cross checking of the transmitter variations.

Figure 6A:
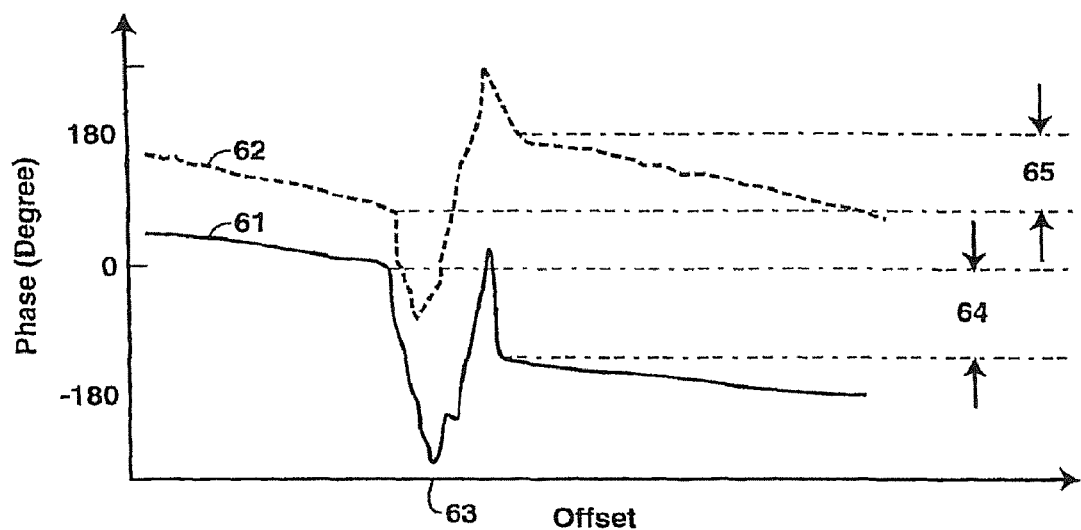
FIGS. 6A-B are schematic plots showing the time (or phase) shift determination by matching the phase at one side of a transmitter-signal anomaly to that at another side.

Anomalous source pulses can also be spotted after transforming the receiver signal into the frequency domain. Rapid amplitude and phase variations and phase discontinuities of the receiver data versus transmitter-receiver offset can be observed at offset windows where the transmitter pulses are anomalous. In the frequency domain, the offset range affected by the anomalous variation of transmitter signal is usually larger than the actual duration of the anomalous transmitter variation due to the finite time window size used in the transformation from the time to frequency domain. FIG. 6A shows a transmitter-signal anomaly in the frequency domain as indicated by dashed lines with arrows. An anomalous transmitter pulse can be detected from the ordinary receiver data as long as it is above the noise floor in at least one of the receiver gathers in the survey. The cross correlation and frequency domain techniques for identifying transmitter anomalies will next be explained in more detail.

Determining Transmitter Anomalies and Tune Shifts by Cross Correlation

Cross correlation is a process that measures how much two time series of numbers resemble each other. The process is explained, for example, at page 18 in Yilmaz's treatise, *Seismic Data Processing*, Society of Exploration Geophysicists (1987). The cross correlation function $C(\tau)$ of time delay $\tau$ between two functions $f(t)$ and $g(t)$ is defined by $$C(\tau) = \sum_t f(t) \cdot g(t+\tau) \Bigg/ \left[ \sqrt{\sum_t f(t) \cdot f(t)*} \sqrt{\sum_t g(t) \cdot g(t)*} \right],$$

where the * represents the complex conjugate of a function. In the present case, $f(t)$ and $g(t)$ are receiver signals in two time windows (bins) to be cross-correlated. Both $f(t)$ and $g(t)$ are assumed to be periodic in the calculation of the cross-correlation function $C(\tau)$ with period equal to the number of time samples in the corresponding window or bin. When the time lag $\tau$ is set to zero, the cross correlation is called zero-lag correlation.

Figure 5C:
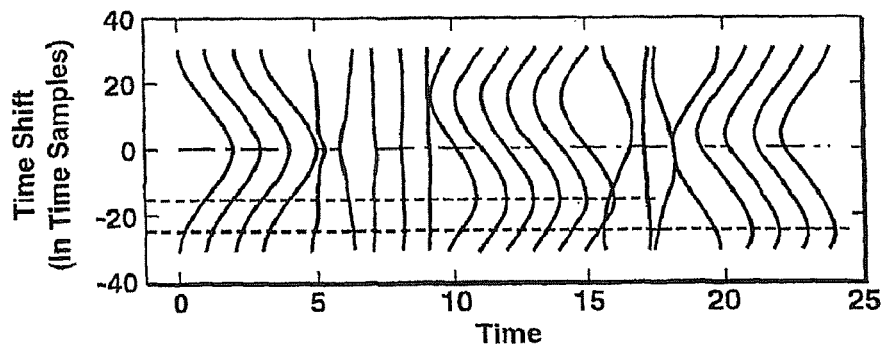

FIGS. 5A-D illustrate a procedure by which the cross-correlation of adjacent time windows (bins) may be used to detect anomalies and compute time shifts. The horizontal labels on each drawing are time measured in bin number. The horizontal axis on FIG. 5C is a composite' scale. The axis labels individual cross-correlation functions as 1, 2 ... 24. For each curve, an excursion to the right represents a positive correlation and an excursion to the left represents a negative correlation. For example, curves 5, 7, 8, 9, and 17 are nearly flat, as the correlations they represent are very small. By contrast; correlations such as 1 through 4 range from low (roughly -1) to high (nearly +1) values, indicating strong correlation between waveforms. A waveform may comprise one or several periods of transmitter pulses. The cross-correlation scale of each correlation (-1 to +1) is not shown in FIG. 5C. For any of the 24 cross-correlation curves in FIG. 5C, the amplitude corresponding to a time shift of zero is the zero-lag cross-correlation coefficient between the two bins associated with the cross-correlation curve.

FIG. 5A shows synthetic receiver data in the time domain. The data consists of a series of waveforms of decreasing amplitude, with anomalies occurring between approximately t=5 and t=10 and between t=15 and t=20. FIG. 5B plots the normalized zero-lag cross-correlation coefficient of adjacent waveforms (i.e., between two successive bins); as expected, when the waveform shape does not change from one period to the next, the cross correlation attains its maximum value of one. However, for the anomalous time windows, the cross correlation becomes small, and this behavior can be used to identify transmitter-waveform anomalies.

Figure 5D:
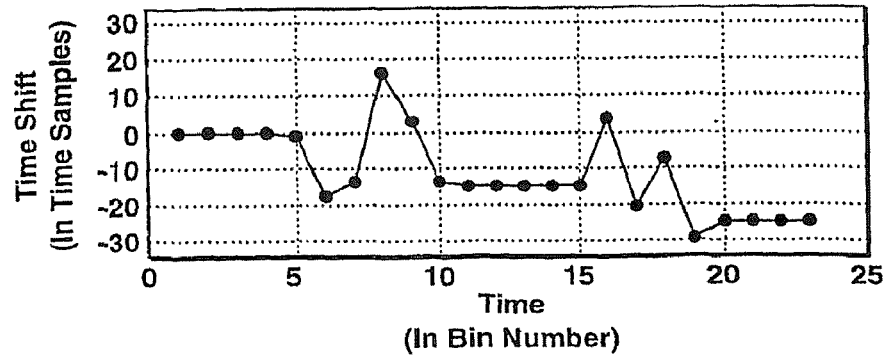

The individual cross-correlation functions between the successive waveforms and certain selected reference waveforms are shown in FIG. 5C. Examining these can clearly differentiate the locations of transmitter phase anomalies from stable locations. The cross-correlation functions between each successive waveform and the reference waveform at t=1, which is the first waveform, attain peak values of one at zero time lag for the first four periods, and then drop to small correlation levels for the next five periods, in the anomalous zone. The next six cross-correlation functions between the corresponding waveforms and the reference waveform at t=4, which is the last stable waveform before the anomalous window, show a maximum correlation at a time shift of around -13 samples (see FIG. 5D, which plots the time shift of the correlation peak). This indicates the time shift between the current stable waveform and the last stable waveform, and is the amount of time shift $\Delta t$ that must be applied to the data after t=10. Similarly, the small cross-correlation values between t=15 and t=20, from the cross correlation between the corresponding waveforms and the reference waveform at t=15, which is again the last stable waveform before the anomaly, indicate a transmitter-anomaly window. The time lag of the maximum cross correlation (about -22 samples) shows the time shift needed with respect to the reference waveform at t=15. FIG. 5C has horizontal broken lines at time shifts of 13 and 22 samples, to help show how the data for FIG. 5D between bins 10 and 15 and again between bins 20 and 24 can be obtained from FIG. 5C. A time sample, the unit for the vertical axis in FIGS. 5C and 5D, represents a discretization of the time scale wherein data collected in the time domain are sampled at a selected regular time interval. One bin contains many samples. Thus, careful examination of FIG. 5A shows that the curve is a succession of closely spaced, discrete data points, or sample values:

While both the zero-lag cross correlation and the lag of maximum cross correlation depart from stable values in the presence of transmitter anomalies, in this example the zero-lag cross correlation is a more reliable indicator of an anomaly. That is, the anomalies are more readily identified in FIG. 5B than in FIG. 5D. For example, t=9 has a small lag value (FIG. 5D), which could indicate a relatively stable window, but its zero-lag cross-correlation value is small (FIG. 5B). In fact, FIG. 5A shows that this area of the data has no signal pulse and is dominated by noise. Therefore, the zero-lag cross correlation is a more robust indicator of anomalous zones.

The reference waveform is defined above as the earlier in time of the two waveforms that are cross correlated. In FIGS. 5C and 5D, the reference waveform was chosen to be the last stable waveform before an anomaly, and it was kept the same until another anomaly is encountered. The way the reference waveforms are chosen in FIG. 5C is for the purpose of illustrating the time shift between the two stable time windows before and after an anomaly window, and represents but one possible embodiment of, the present inventive method. In field CSEM data, the waveform varies with time (or transmitter location) from the earth's filtering effect. The reference waveform is preferably chosen from a time as close to the time of the waveform it correlates with as possible in order to avoid the waveform variation form the earth's filtering effect. Once the time shift across an anomaly is determined, the reference waveform should preferably be changed to the receiver waveform from the time bin immediately prior to the time bin being tested in time intervals of stable transmitter signals. When an anomaly has been detected, the waveform in the last stable time bin prior to the anomalous zone is preferably used as the reference waveform in order to determine the relative time shift across the anomaly.

In one embodiment of the invention, the cross-correlation technique is used to detect and correct for transmitter anomalies as follows:

1. Scan through the received data for each ordinary receiver channel, computing the cross-correlation function for adjacent bins of the data corresponding to one (or more) periods of the transmitter signal. While the zero-lag cross-correlation remains above a pre-set critical value (close to one), continue to update the reference waveform to be the waveform from the previous time bin.

2. When the normalized zero-lag cross-correlation coefficient becomes less than the critical value, designate this time (t*) as that of an anomaly. Store the earlier (in time) of the two data bins used in the cross-correlation computation. This bin is the last uncorrupted receiver data segment occurring before the anomaly, and becomes the new reference waveform.

3. Continue scanning through the receiver data, cross correlating the reference waveform stored in step (2) with following data segments. When the maximum cross-correlation regains a value above the critical value, the end of the anomalous region has been found. The time lag at which the maximum cross-correlation value was found gives the time shift $\Delta t$ that must be applied to all of the data after the time of the anomaly (t*) found, in step (2). Apply this time shift to all data after t*. Replace the reference waveform with the data in the time bin just after the end of the anomalous region, which was found in this step.

4. Repeat steps (1)-(3) until all data from the current receiver gather have been processed.

5. All transmitter-caused phase anomalies have been identified and corrected for this receiver. Anomalous zones may be discarded, as desired, in further processing steps.

Figure 7:
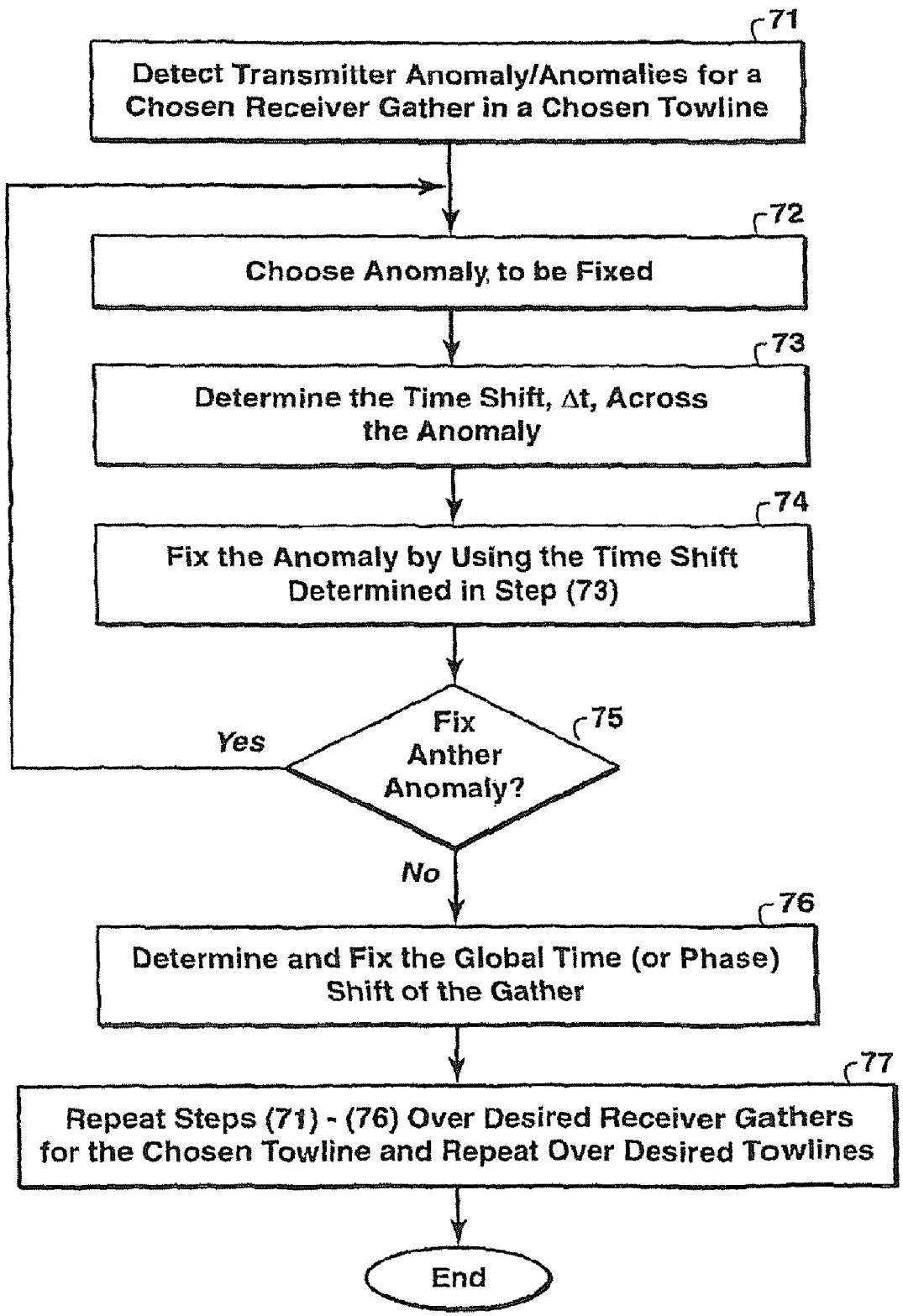
FIG. 7 is a flow chart showing basic steps in one embodiment of the present inventive method.

It may be noted elsewhere that steps 1-3 above correspond to steps 71-73 of the flowchart in FIG. 7 for the embodiment of the invention in which waveform cross correlation is used. Determining Transmitter Anomalies and Time Shifts by Phase Matching In the frequency domain, both amplitudes and phases in a common-receiver gather can be plotted versus the transmitter-receiver offset (or the transmitter location relative to the receiver) for each of the frequency components. FIG. 6A shows the phase variation versus transmitter-receiver offset of a common-receiver gather at two different frequencies f1 (curve 61) and f2 (curve 62). The phase and its slope with respect to offset should be continuous and slowly-varying with offset in the offset windows where the transmitter signal is stable (see left and right parts of each of the curves in FIG. 6A). However, the phase or its slope will be discontinuous across a transmitter-signal anomaly location or window, such as the anomaly that occurs in the vicinity of offset 63 at the middle part of the curves in FIG. 6A. The phase continuity with offset can be used to determine the phase error (or time shift) caused by transmitter-signal anomalies.

Figure 6B:
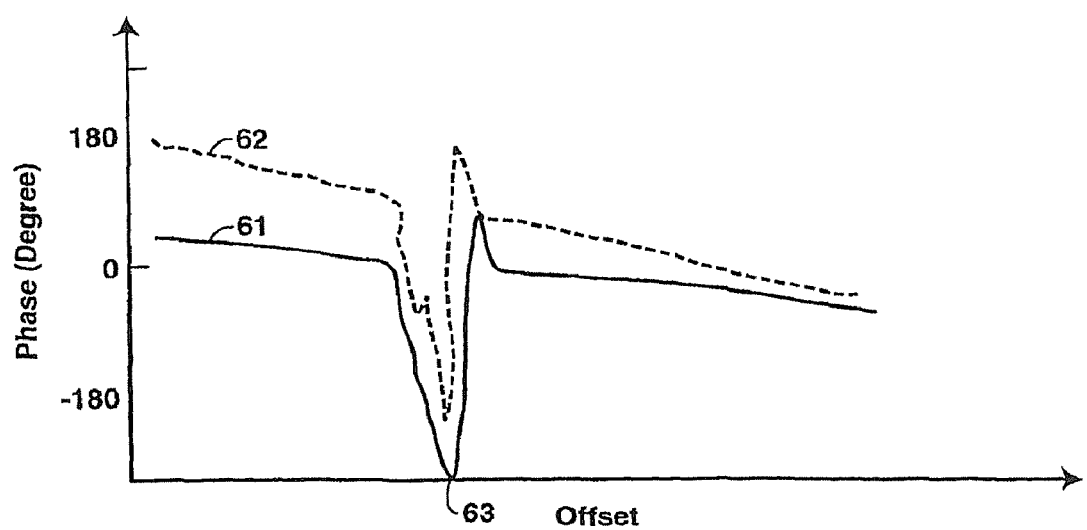

To do this, the phase at one side of the anomaly is matched to the phase at the other side by applying a phase shift equal to the phase jump 64 or 65 as indicated in FIG. 6A to one side of the data. The phase becomes continuous across the anomaly location after the shift as shown in FIG. 6B. (The rapid phase oscillations near the anomaly location are artifacts from the transformation from time domain to frequency domain.) The phase shift $\Delta\phi$ frequency f1 is related to a time shift $\Delta t$ by the relationship $\Delta t = \Delta\phi/(2\pi f1)$. The phases of all frequencies should be matched across the anomaly by a single time shift if the anomaly is caused be the transmitter. The time shift derived from the phase matching at one frequency is applicable for all other frequencies. This has great value for applications on real data. The lowest-frequency data have high signal-to-noise ratio over an extended offset range compared to data at higher frequencies. The time shift can be determined reliably from data at the lowest frequency and can then be applied to data at all other frequencies.

The phase matching procedure described above can be applied to a transmitter anomaly of duration much larger than the period of a normal pulse by using the continuity of both the phase and its derivative with respect to offset. The phase at one side of the transmitter anomaly can be extrapolated to the other side by using its slope with respect to offset.

The relative time shift across a time (or offset) window with anomalous transmitter-signal variation can also be obtained from the receiver data in time domain by using the cross-correlation technique used for detecting the transmitter anomalies. This time shift can be applied to the data at one side of the anomaly achieving the phase match before and after the anomaly. This technique is more effective than the phase-matching technique discussed above for transmitter anomalies of extended duration due to its independence on the phase continuity property. When using the cross-correlation method to determine the phase error, the time shift determination is also performed in the time domain. The correction steps may be performed in either the time or frequency domain. When the transmitter anomaly duration is long, the cross-correlation method may be preferred over the phase-matching method as phase continuity can be difficult to apply across large time intervals.

The techniques for determining the phase error described above can be applied to every detected anomaly along a towline. After finishing all the phase matches, the phases along the towline become consistent.

When a transmitter-signal anomaly can be observed on several receivers, the time shift determined from one receiver gather may be appropriate for the same anomaly appearing on other receivers, because the clock timing errors and errors associated with a receiver are either corrected already or are usually small compared to errors from a transmitter-signal anomaly. This is useful when the time shift of a transmitter anomaly can be determined accurately from one receiver, but is hard to determine from other receivers because of low signal amplitudes measured by those receivers.

The time shift determined in step 76 of FIG. 7 for a given receiver includes both timing errors of the clock and transmitter anomalies not detected in step 71 in time windows where the data fall below the noise floor. The time shifts determined in step 76 from different receivers in a towline should be very close to a common time shift value, which corresponds to the initial phase error of the towline, if all transmitter-signal anomalies have been detected and corrected in steps 71-75 and errors from other sources are negligible. If some transmitter anomalies have occurred, but have not been detected in step 71, between any two receivers in a towline, the time shifts determined in step 76 from the two receiver gathers will be different. Applying the time shifts derived from step 76 to the corresponding receiver gathers will correct any transmitter anomalies that might have happened but have neither been detected in step 71 nor been corrected in step 74.

The foregoing application is directed to particular embodiments of the present invention for the purpose of illustrating it. It will be apparent, however, to one skilled in the art, that many modifications and variations to the embodiments described herein are possible. For example, typically a CSEM survey is performed over water, and the source is towed along a line (called the tow line) over stationary receivers. But the invention applies to surveys over land as well, where the source will not need to be towed, but will nevertheless typically be moved to different offsets along a line. The line of different offsets may be referred to generally as a source line. A typical survey will consist of many source lines, often a grid of parallel and perpendicular lines. All such modifications and variations are intended to be within the scope of the present invention, as defined in the appended claims.

The invention claimed is:

1. A method for correcting source-related phase errors in electromagnetic data signals recorded by receivers in a controlled-source electromagnetic survey of a subsurface region, comprising:
    (a) selecting a source line from the survey and an ordinary survey receiver associated with the selected source line, and obtaining the electromagnetic data measured by the selected receiver for source positions along the selected source line, said obtained data being referred to as a "receiver gather";
    (b) finding a source-related anomaly in the receiver gather by examination of said data;
    (c) determining from the receiver gather a time shift or corresponding phase shift due to the anomaly; and
    (d) using the time/phase shift to adjust the phase of the data in the receiver gather;
wherein one or more of (a)-(d) are performed using a computer.

2. The method of claim 1, further comprising:
    (e) repeating steps (b)-(d) until any other source-related anomalies in the selected receiver gather are found and corrected by phase adjustment.

3. The method of claim 2, further comprising:
    (f) repeating steps (a)-(e) for selected other ordinary receivers associated with the selected source line.

4. The method of claim 3, further comprising repeating steps (a)-(f) for selected other survey source lines.

5. The method of claim 2, further comprising determining whether the receiver gather has a global time/phase error, and if so, deteiiiiiining the error and correcting the gather by applying a time/phase shift.

6. The method of claim 1, wherein an anomaly is found by zero-lag cross-correlation between consecutive bins of the data in the receiver gather in time domain.

7. The method of claim 1, wherein an anomaly is found by determining and comparing time intervals between neighboring zero crossings when the gather data is plotted vs. time.

8. The method of claim 1, wherein an anomaly is found by transforming the receiver gather to components in the frequency domain and looking for a discontinuity when data phase for a component is plotted vs. source-receiver offset.

9. The method of claim 1, wherein the time shift due to an anomaly is determined in time domain by performing cross correlation between two bins of the data in the receiver gather on either side of the anomaly.

10. The method of claim 1, wherein the phase shift due to an anomaly is determined in frequency domain by matching data phase at the anomaly's beginning to that at the anomaly's end.

11. The method of claim 10, wherein the first order derivative of phase with respect to source-receiver offset is also matched across the anomaly.

12. The method of claim 5, wherein the global error is determined in frequency domain using a frequency scaling property of data phase at near offsets.

13. The method of claim 1, wherein the data in the receiver gather is adjusted for the anomaly by applying a phase shift correction of $\exp(-i\omega\Delta t)$ in frequency domain to all data just after an anomaly window, phase shift $\Delta\phi$ and timing error $\Delta t$ being related by $\Delta\phi=\omega\Delta t$.

14. The method of claim 1, wherein gather data below noise level is adjusted based on a time/phase shift determined from data in the same receiver gather that are above noise level.

15. The method of claim 1, wherein the source-related anomaly in the receiver gather is found by examining the data gather for changes in pulse shape or pulse period too abrupt to have been caused by geological conditions.

16. A method for producing hydrocarbons from a subterranean region, comprising:
    (a) obtaining electromagnetic field data from a controlled-source electromagnetic survey of the subterranean region;
    (b) obtaining processing of the survey data, said processing having corrected the data by adjusting them for source-related phase errors by:
        (i) selecting a source line from the survey and an ordinary survey receiver associated with the selected source line, and obtaining the electromagnetic data measured by the selected receiver for source positions along the selected source line, said obtained data being referred to as a "receiver gather";
        (ii) finding a source-related anomaly in the receiver gather by examination of said data;
        (iii) determining from the receiver gather a time shift or corresponding phase shift due to the anomaly; and
        (iv) using the time/phase shift to adjust the phase of the data in the receiver gather;
wherein one or more of (i)-(iv) are performed using a computer; and
    (c) producing hydrocarbons found in the subsurface region at a location corresponding to a resistivity anomaly in a map of the phase-adjusted electromagnetic field data.

* * * * *